United States Patent [19]
Konishi et al.

[11] Patent Number: 5,854,792
[45] Date of Patent: Dec. 29, 1998

[54] NETWORK CONNECTION APPARATUS

[75] Inventors: Kuniyoshi Konishi, Tokyo; Toshifumi Shiba, Iruma, both of Japan

[73] Assignee: Kabushiki Kaisha Toshiba, Kawasaki, Japan

[21] Appl. No.: 712,645

[22] Filed: Sep. 11, 1996

[30] Foreign Application Priority Data

Sep. 12, 1995 [JP] Japan ................................... 7-234028

[51] Int. Cl.$^6$ ................................................ H04L 12/54
[52] U.S. Cl. ............................................................. 370/428
[58] Field of Search .................................... 370/412, 401, 370/402, 428, 429, 217, 218, 221, 250

[56] References Cited

U.S. PATENT DOCUMENTS

| | | | |
|---|---|---|---|
| 4,719,621 | 1/1988 | May ........................................ | 340/825.5 |
| 5,165,021 | 11/1992 | Wu et al. ................................. | 395/250 |
| 5,274,631 | 12/1993 | Bhardwaj . | |
| 5,307,345 | 4/1994 | Lozowick et al. ....................... | 370/428 |
| 5,521,913 | 5/1996 | Gridley ................................... | 370/428 |

Primary Examiner—Ajit Patel
Attorney, Agent, or Firm—Oblon, Spivak, McClelland, Maier & Neustadt, P.C.

[57] ABSTRACT

Each network control section sequentially writes, into a common memory, data items included in a transmission frame output from each network, outputs a notification to notify start of writing and a notification to notify completion of normal writing, reads the transmission frame stored in the common memory in response to a transmission command, and transmits the read transmission frame to a corresponding network. When a C.T mode is set, a route control section receives the notification to notify start of writing from each network control section, and outputs a transmission command to a network control section corresponding to a destination network designated by a destination address included in the transmission frame. Further, when an S.F mode is set, the route control section receives the notification to notify completion of normal writing from each network control section, and outputs the transmission command to the network control section corresponding to the destination network designated by the destination address included in the transmission frame.

16 Claims, 10 Drawing Sheets

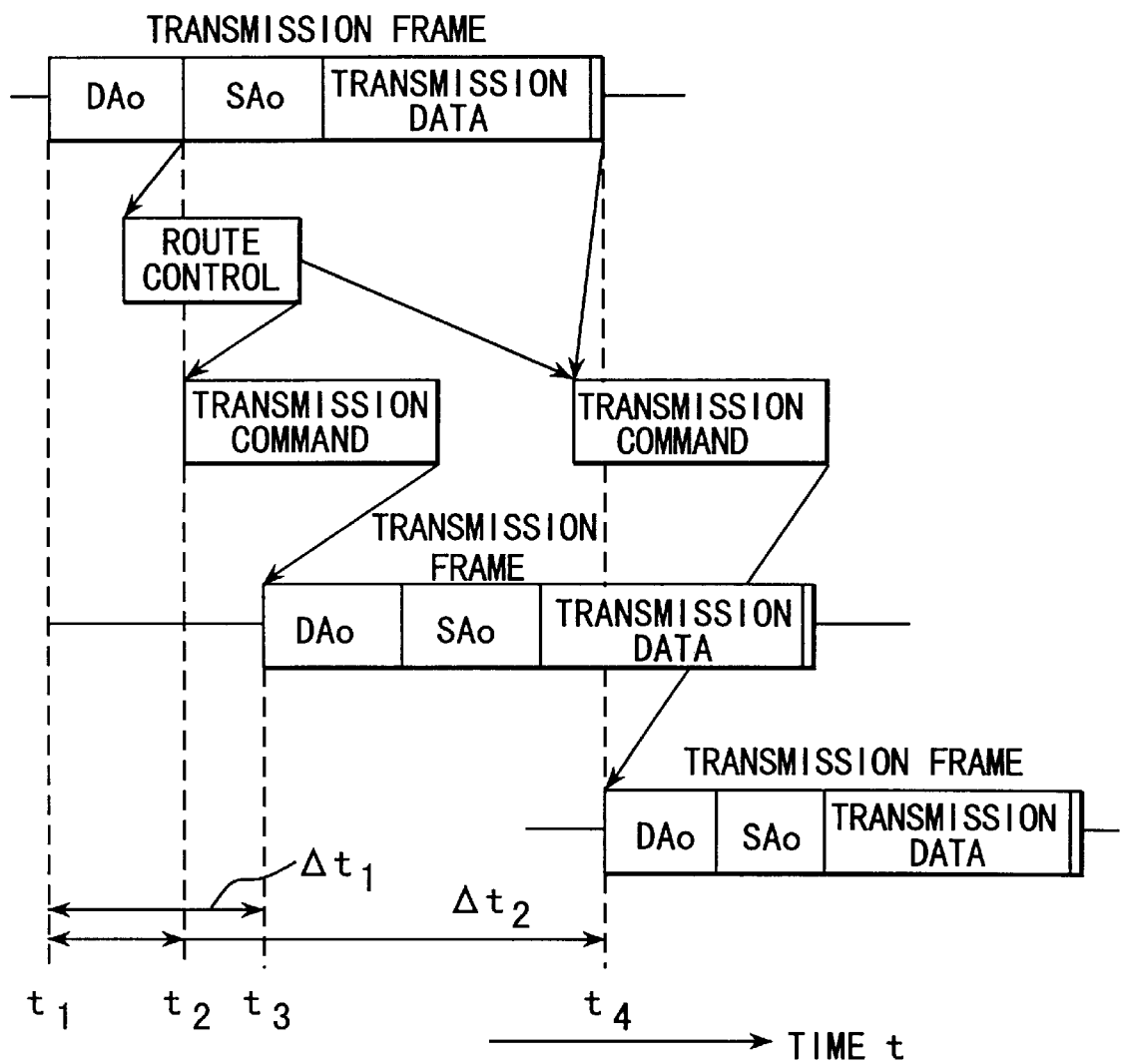
F I G. 5

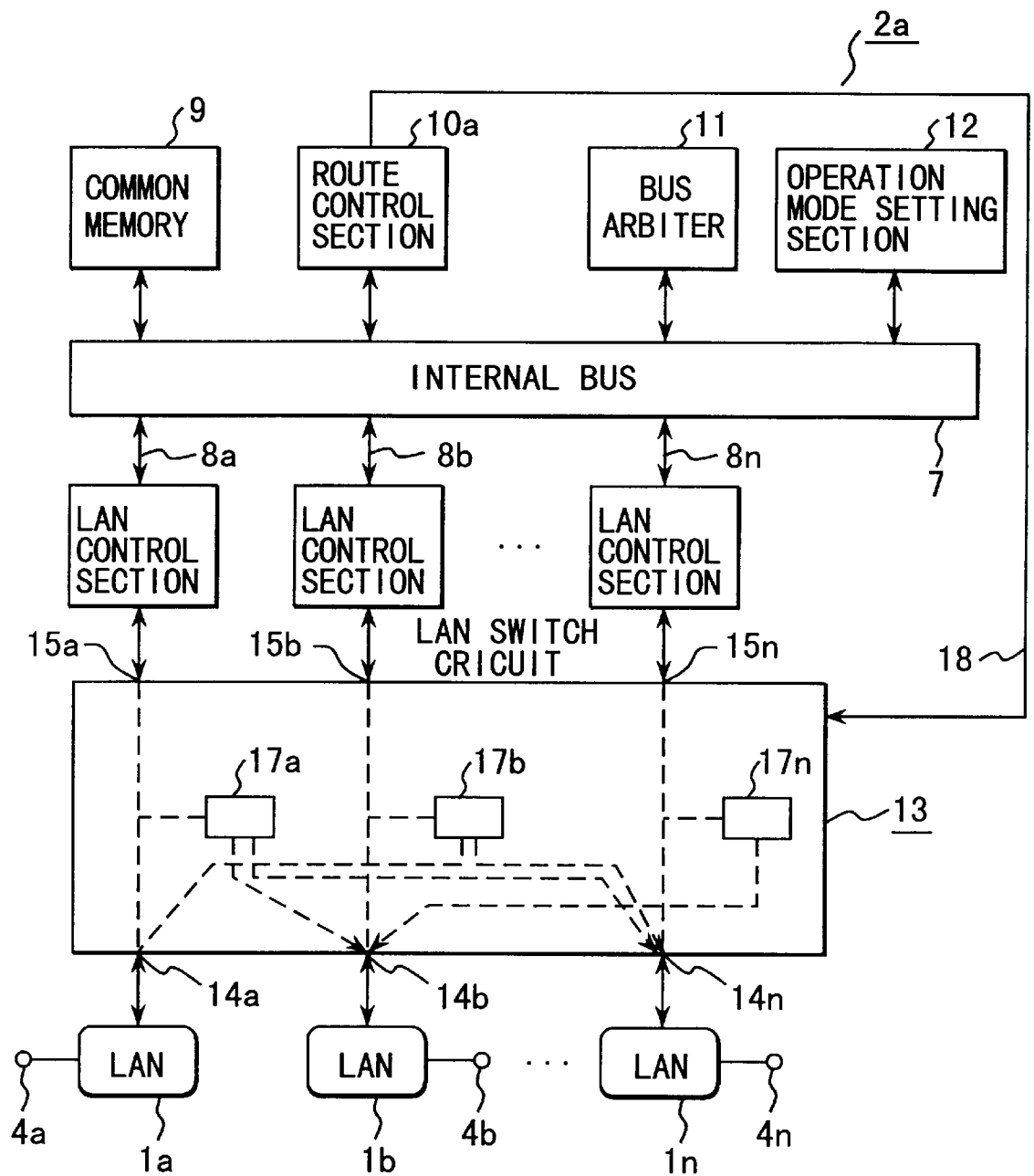
F I G. 6

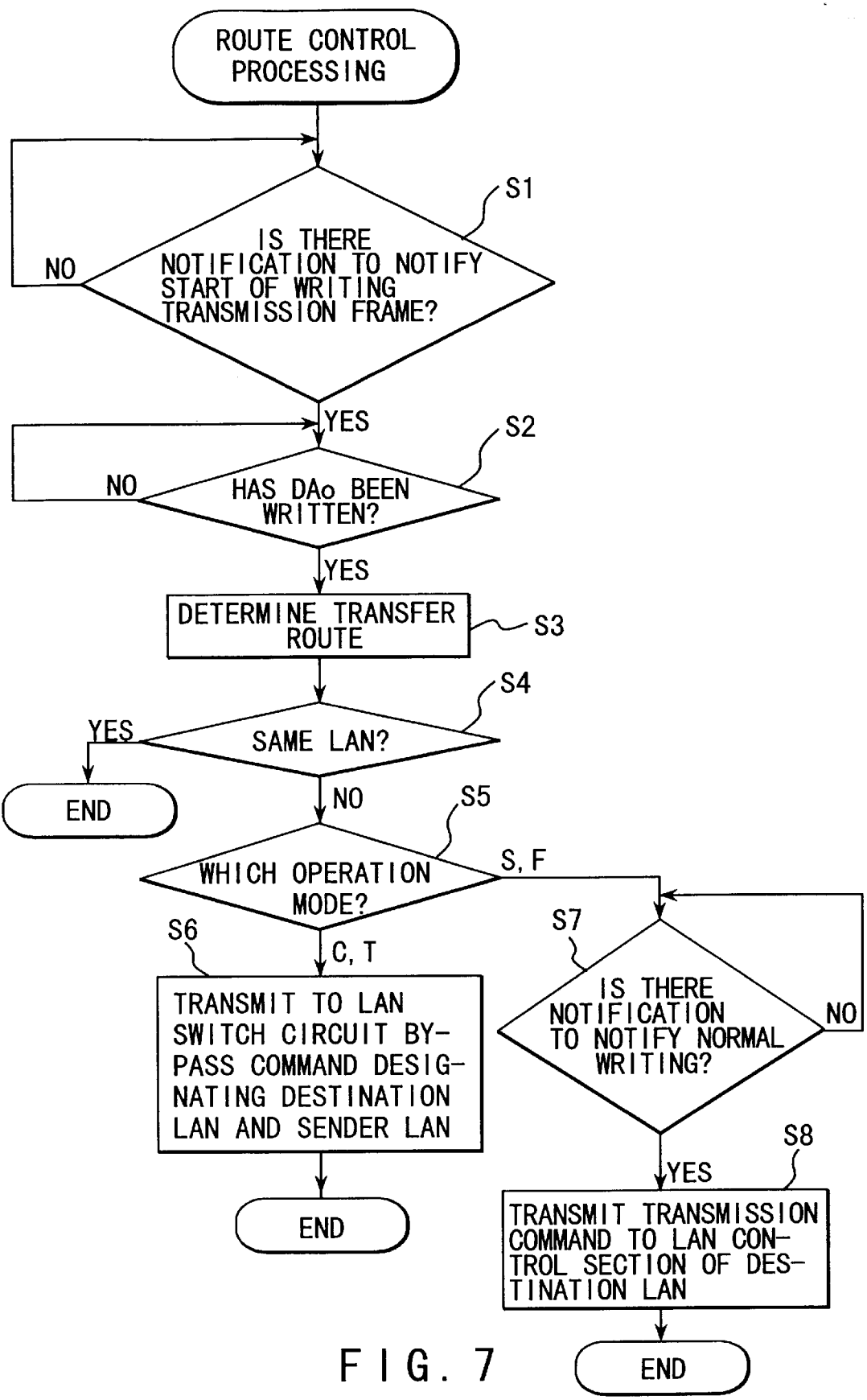
F I G. 7

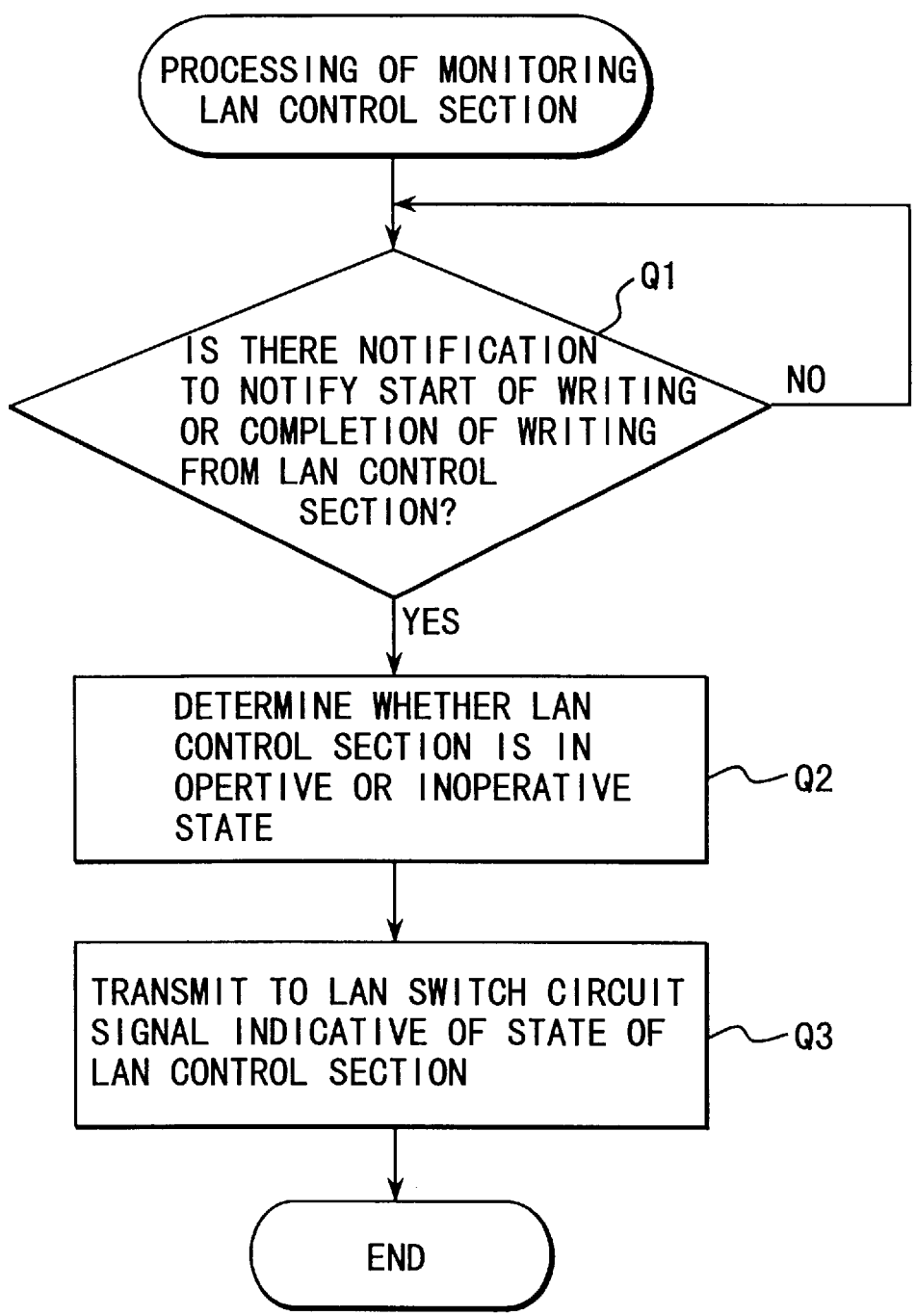
F I G. 10

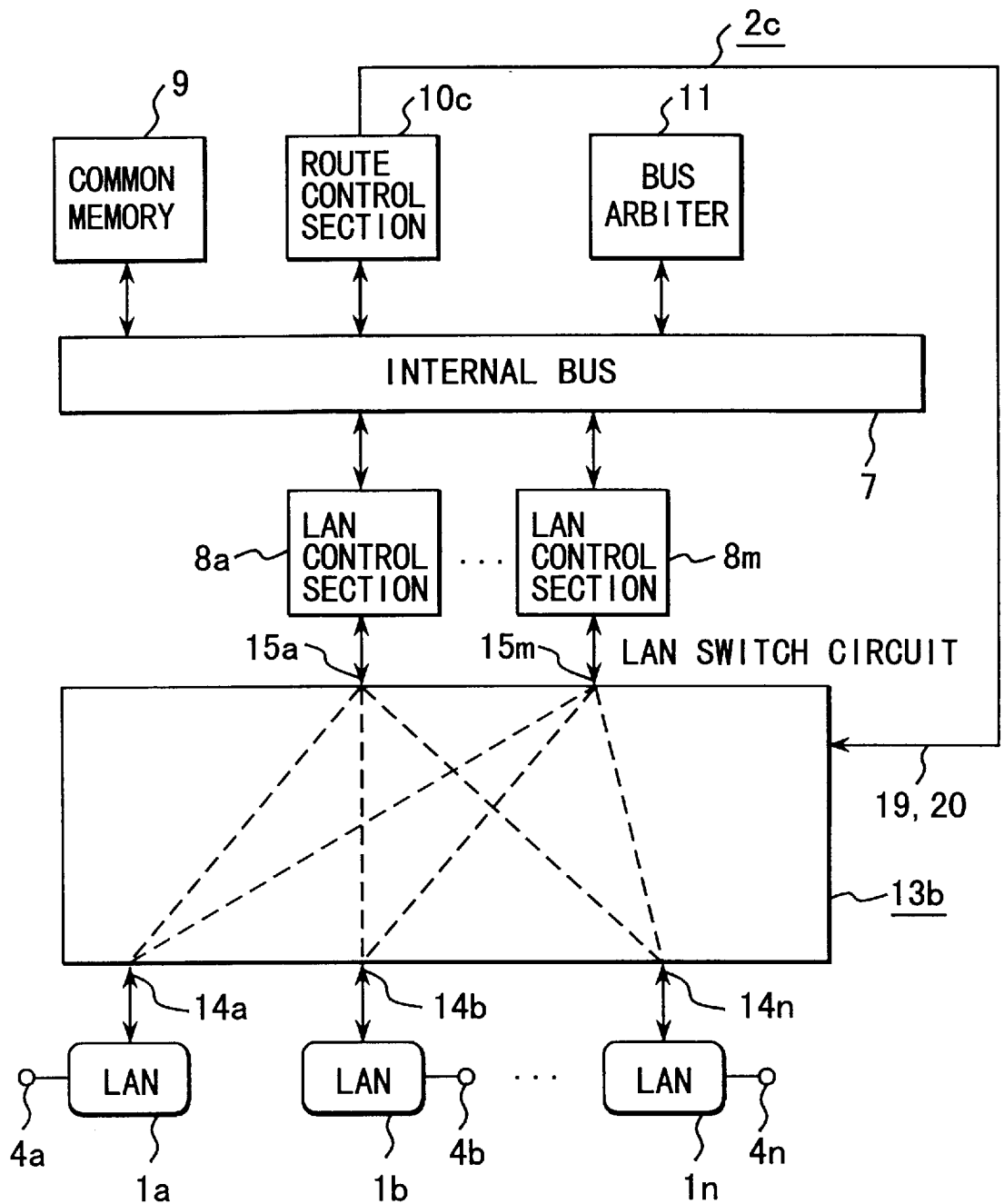
F I G. 12

NETWORK CONNECTION APPARATUS

BACKGROUND OF THE INVENTION

1. Field of the Invention

This invention relates to a network connection apparatus for connecting a plurality of networks to each other.

2. Description of the Related Art

In a LAN (Local Area Network) or a WAN (Wide Area Network), multiple nodes such as a computer, etc. are connected to the transmission line thereof. If nodes, the number of which exceeds that of nodes allowable in each network, are connected thereto, the amount of traffic on the line will excessively increase, thereby reducing the efficiency of data transmission between the nodes. Further, the length of each transmission line is also limited.

In light of the above, a plurality of independent networks are established. Data transmission between the networks is performed via a network connection apparatus which connects them to each other.

For example, to transmit data from a node of a network to a node of another network, a transmission frame which incorporates a destination address DA0 indicative of a destination node, a sender address SA0 indicative of a sender node, and transmission data is output to the transmission line.

The network connection apparatus receives the transmission frame transmitted through the transmission line and temporarily stores it in a common memory incorporated therein. If the transmission frame stored in the common memory is one to be transmitted to a node of another network, the network connection apparatus reads the transmission frame from the common memory and transmits it to the another network (i.e. the destination network).

The destination network of the transmission frame is specified by the destination address DA0 set in a front end portion of the frame. Therefore, when the destination address DA0 set in the front end portion has been stored in the common memory, the destination network is determined, and the transmission of the transmission frame to the destination network is started.

The mode assumed upon confirming the destination address DA0, in which transmission of the transmission frame is started, is defined as a "Cut Through Mode" (hereinafter referred to simply as "C.T mode"). In the C.T mode, the time required to transmit the transmission frame can considerably be reduced. This is because the time by which the transmission frame is delayed in the network connection apparatus corresponds to the time required only to store in the common memory the destination address DA0 set in the front end portion of the frame.

Alternatively, transmission of the transmission frame may be started by specifying the destination network on the basis of the destination address DA0 and reading the transmission frame from the common memory, after storing the overall transmission frame in the common memory and confirming that the transmission frame has normally been received. This operation mode is defined as a "Store & Forward Mode" (hereinafter referred to simply as an "S.F mode").

In the S.F mode, input of an erroneous transmission frame to a destination node can be avoided, since the transmission frame is not transmitted if it contains an error or it collides with another transmission frame.

However, in the network connection apparatus which employs the C.T mode, even a transmission frame which contains an error or has collided with another frame is transmitted to another network. The error or collision is detected by a destination node (data-receiving node). The destination node in turn outputs to the sender node a transmission frame which requests retransmission of data. As a result, the amount of traffic in each network is increased, and hence the transmission efficiency of the overall network system is reduced.

On the other hand, in the network connection apparatus which employs the S.F mode, transmission of the transmission frame is not started until the overall transmission frame is stored in the common memory. Accordingly, the delay time in the connection apparatus increases, which inevitably increases the time required to transmit the transmission frame, and accordingly makes it difficult to transmit data at high speed between nodes.

In addition, in the S.F mode, no erroneous transmission frame is transmitted to the outside even if a great number of erroneous transmission frames are stored in the common memory. Therefore, each node on the sender side determines that the network connection apparatus is normally operating, with the result that a great number of transmission frames are transmitted from each node to the connection apparatus, irrespective of the actual state of the apparatus. If the common memory does not have a very large memory capacity, transmission frames input in the network connection apparatus may well be damaged.

SUMMARY OF THE INVENTION

It is a first object of the invention to provide a general purpose network connection apparatus capable of preferentially performing high-speed data transmission or preferentially enhancing the reliability of transmission data, depending upon the type of the transmission data or the object of data transmission.

It is a second object of the invention to provide a network connection apparatus capable of transmitting data at higher speed when high-speed data transmission is designated.

The invention is applicable to a network connection apparatus connected between a plurality of networks for transferring, to a destination node belonging to one of the networks, a transmission frame output from a sender node belonging to another network, the transmission frame including a destination address, a sender address and transmission data.

To attain the first object, the network connection apparatus of the invention comprises a common memory for temporarily storing transmission frames; and a plurality of network control sections each for writing into the common memory a transmission frame output from that one of the networks which is connected thereto, outputting a notification to notify start of writing and a notification to notify completion of normal writing, and reading the transmission frame written in the common memory in response to a transmission command, so as to transmit the transmission frame to the network connected thereto.

Further, the network connection apparatus further comprises means for setting the operation mode of the network connection apparatus to a Cut Through Mode or a Store & Forward Mode; means operative in the Cut Through Mode for receiving from each network control section the notification to notify start of writing, and transmitting the transmission command to that one of the network control sections which is connected to a destination network determined by the destination address included in a transmission frame; and means operative in the Store & Forward Mode for receiving from each network control section the notification to notify completion of normal writing, and transmitting the transmission command to that one of the network control sections which is connected to the destination network determined by the destination address included in a transmission frame.

In the network connection apparatus constructed as above, where the operator of the network system sets the operation mode, for example, to the C.T mode, the destination network is specified from a destination address DA0 included in a transmission frame received, when the destination address DA0 has been written into the common memory. Then, the network control section connected to the destination network sequentially reads data items of the transmission frame sequentially written into the common memory, and starts to transmit the frame to the destination network.

On the other hand, where the operator of the system sets the operation mode to the S.T mode, after all data items of the transmission frame are normally written into the common memory, the network control section reads the transmission frame therefrom and starts to transmit it to the destination network.

In light of this, it is preferable to select the C.T mode when the network connection apparatus is incorporated in a network system which mainly requires high-speed data transmission, and to select the S.F mode when the network connection apparatus is incorporated in a network system which mainly requires transmission of highly reliable data.

To attain the second object, the network connection apparatus comprises: a common memory for temporarily storing transmission frames; a plurality of network control sections each for writing into the common memory a transmission frame output from that one of the networks which is connected thereto, outputting a notification to notify start of writing and a notification to notify completion of normal writing, and reading the transmission frame written in the common memory in response to a transmission command, so as to transmit the transmission frame to the network connected thereto; and a network switch circuit interposed between each network and a corresponding network control section for connecting the each network and the corresponding network control section in a normal state, and directly transmitting a transmission frame output from a sender network, to a destination network when receiving a bypass command which designates the destination network and the sender network.

This network connection apparatus further comprises means for setting the operation mode of the network connection apparatus to a Cut Through Mode or a Store & Forward Mode; means operative in the Cut Through Mode for receiving from each network control section the notification to notify start of writing, and transmitting to the network switch circuit the bypass command which designates the destination network and the sender network determined by the destination address and the sender address included in the transmission frame, respectively; and means operative in the Store & Forward Mode for receiving from each network control section the notification to notify completion of normal writing, and transmitting the transmission command to that one of the network control sections which is connected to the destination network determined by the destination address included in the transmission frame.

In the network connection apparatus constructed as above, a network switch circuit for directly transmitting a transmission frame from a sender network to a destination network is interposed between each network and a corresponding network control section.

Where the operation mode is set to the C.T mode, the destination network is specified when a destination address DA0 included in a transmission frame received has been written into the common memory. Then, a bypass command which designates a sender network Then, a bypass command which designates a sender network and the specified destination network is transmitted to the network switch circuit. As a result, the received transmission frame is transferred to the destination network via the network switch circuit, bypassing the network control section.

Thus, the processing load on the network control section is reduced, and the time required to transmit the transmission frame is shortened.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 5 is a timing chart, illustrating the operations of the network connection apparatus of the first embodiment;

FIG. 6 is a schematic block diagram, showing the structure of a network connection apparatus according to a second embodiment of the invention;

FIG. 7 is a flowchart, useful in explaining a transfer route determining operation performed in the network connection apparatus of the second embodiment;

FIG. 10 is a flowchart, illustrating a monitoring operation for monitoring each LAN control section incorporated in the network connection apparatus of the third embodiment;

FIG. 12 is a schematic block diagram, showing the structure of a network connection apparatus according to a fourth embodiment of the invention.

DETAILED DESCRIPTION OF THE PREFERRED EMBODIMENTS

The embodiments of the invention will be described in detail with reference to the accompanying drawings.
(First Embodiment)

Figure 1:
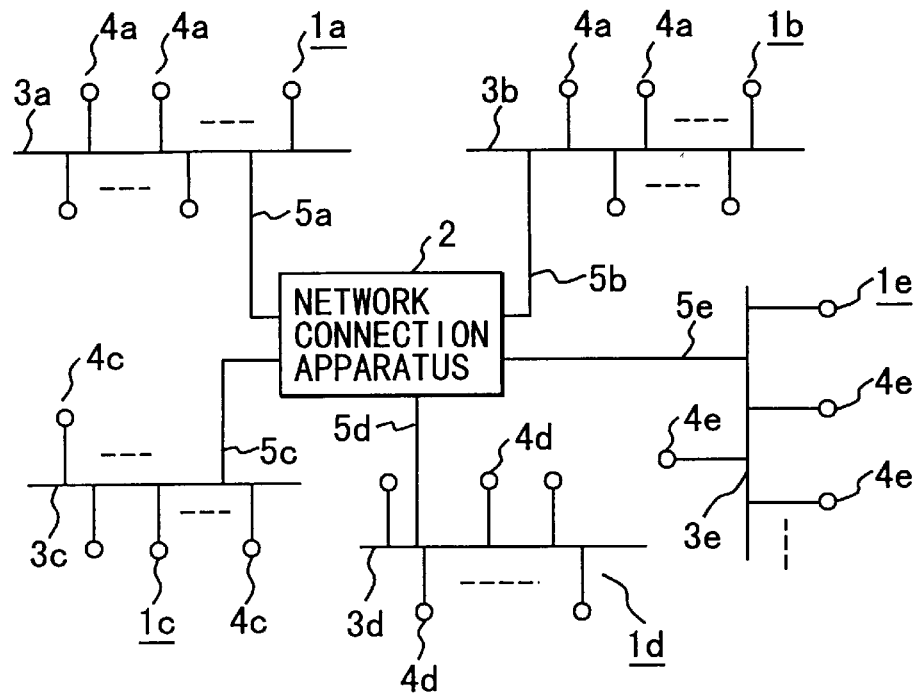
FIG. 1 is a schematic view, showing a network system which incorporates a network connection apparatus according to a first embodiment of the invention.

FIG. 1 is a schematic view, showing a network system which incorporates a network connection apparatus according to a first embodiment of the invention.

The network system comprises LANs 1a, 1b, 1c, 1d, 1e as networks, and a network connection apparatus 2 which connects the LANs to each other. Alternatively, the network system may comprises WANs (Wide Area Networks).

A plurality of nodes 4a, 4b, 4c, 4d, 4e are connected to each of respective transmission lines 3a, 3b, 3c, 3d, 3e of the LANs 1a, 1b, 1c, 1d, 1e. The network connection apparatus 2 is connected to the transmission lines 3a, 3b, 3c, 3d, 3d of the LANs 1a, 1b, 1c, 1d, 1e by means of signal lines 5a, 5b, 5c, 5d, 5e, respectively.

Figure 2:
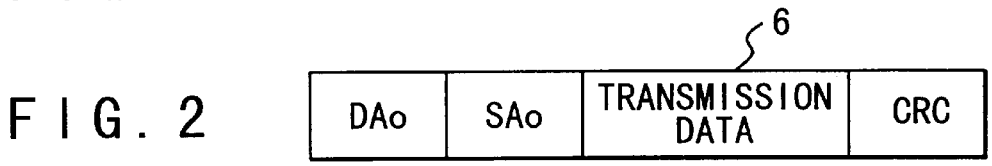
FIG. 2 is a view, showing a format of a transmission frame to be transmitted through each transmission line of the network system.

In the above-described network system, each of the nodes 4a–4e of the LANs 1a–1e outputs a transmission frame 6 as shown in FIG. 2, which incorporates transmission data, to a corresponding one of the transmission lines 3a–3e.

As is shown in FIG. 2, a destination address DA0 (MAC address) specifying a destination node is set in a front end portion of the transmission frame 6, and a sender address SA0 (MAC address) specifying the sender node itself is set in a second portion of the same following the front end portion. In a portion following the second portion, transmission data is set, and an error check code CRC is set in the last portion of the frame.

Figure 3:
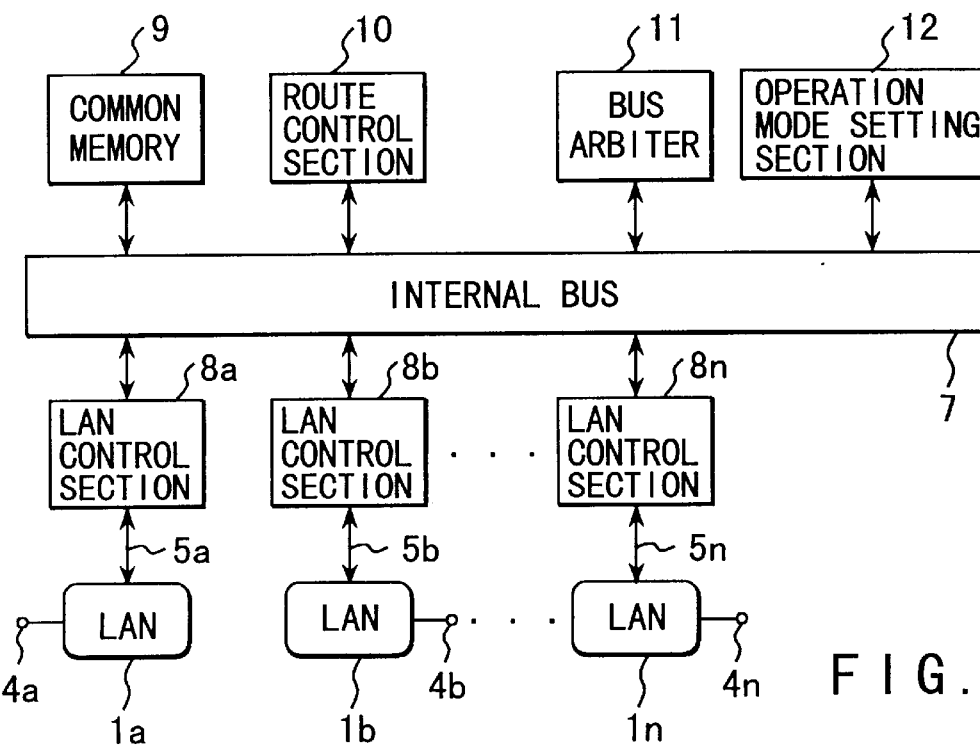
FIG. 3 is a schematic block diagram, showing the network connection apparatus according to the first embodiment of the invention.

FIG. 3 is a schematic block diagram, showing the structure of the network connection apparatus 2. As is shown in FIG. 3, LAN control sections 8a–8n as network control sections are connected to the LANs 1a–1n via the signal lines 5a–5n, and also to an internal bus 7. Further, a common memory 9, a route control section 10, a bus arbiter 11 and an operation mode setting section 12 are connected to the internal bus 7.

The common memory 9 has a plurality of memory areas for temporarily storing transmission frames 6 transmitted from the LANs 1a–1n via the LAN control section 8a–8n, respectively.

When the LAN control sections 8a–8n and the route control section 10 have simultaneously accessed the common bus 7, the bus arbiter 11 performs access adjustment so as to prevent contention on the common bus 7.

Each LAN control section 8a–8n fetches a corresponding transmission frame 6 transmitted through a corresponding transmission line 3a–3n connected to a corresponding LAN 1a–1n, thereby converting the fetched frame 6 to parallel data and storing that area of the common memory 9 which is imparted to itself. When the LAN control section starts to write the transmission frame 6 into the common memory 9, it informs the route control section 10 of the start of writing via the internal bus 7.

During writing the transmission frame 6 into the common memory 9, each LAN control section 8a–8n determines, for example, from the error check code CRC set in the rear end portion of the frame, whether or not an error occurs in the frame 6, or whether or not collision of data occurs in the transmission line of the LAN. If it is determined that the frame is normal, the LAN control section informs, via the internal bus 7, the route control section 10 that the frame has normally been written into the memory.

Further, when each LAN control section 8a–8n receives a transmission command (to transmit the transmission frame 6) directed thereto from the route control section 10 via the internal bus 7, it reads the frame 6 out of the memory area of the common memory 9 which is assigned thereto, thereby converting the read frame 6 to serial data and transmitting the data to a corresponding transmission line 3a–3n of a corresponding LAN 1a–1n connected thereto.

When each LAN control section 8a–8n detects occurrence of an error or of collision in the transmission frame 6 while it transmits the frame to a corresponding LAN 1a–1n, it again outputs the same transmission frame 6 by the CSMA/CD method.

The operation mode setting section 12 is constituted, for example, by a dual in-line package switch (DIP-switch), etc. The operator of the network system sets the operation mode of the network connection apparatus 2 to the aforementioned "C.T mode" or "S.F mode", by operating the operation mode setting section 12.

Figure 4:
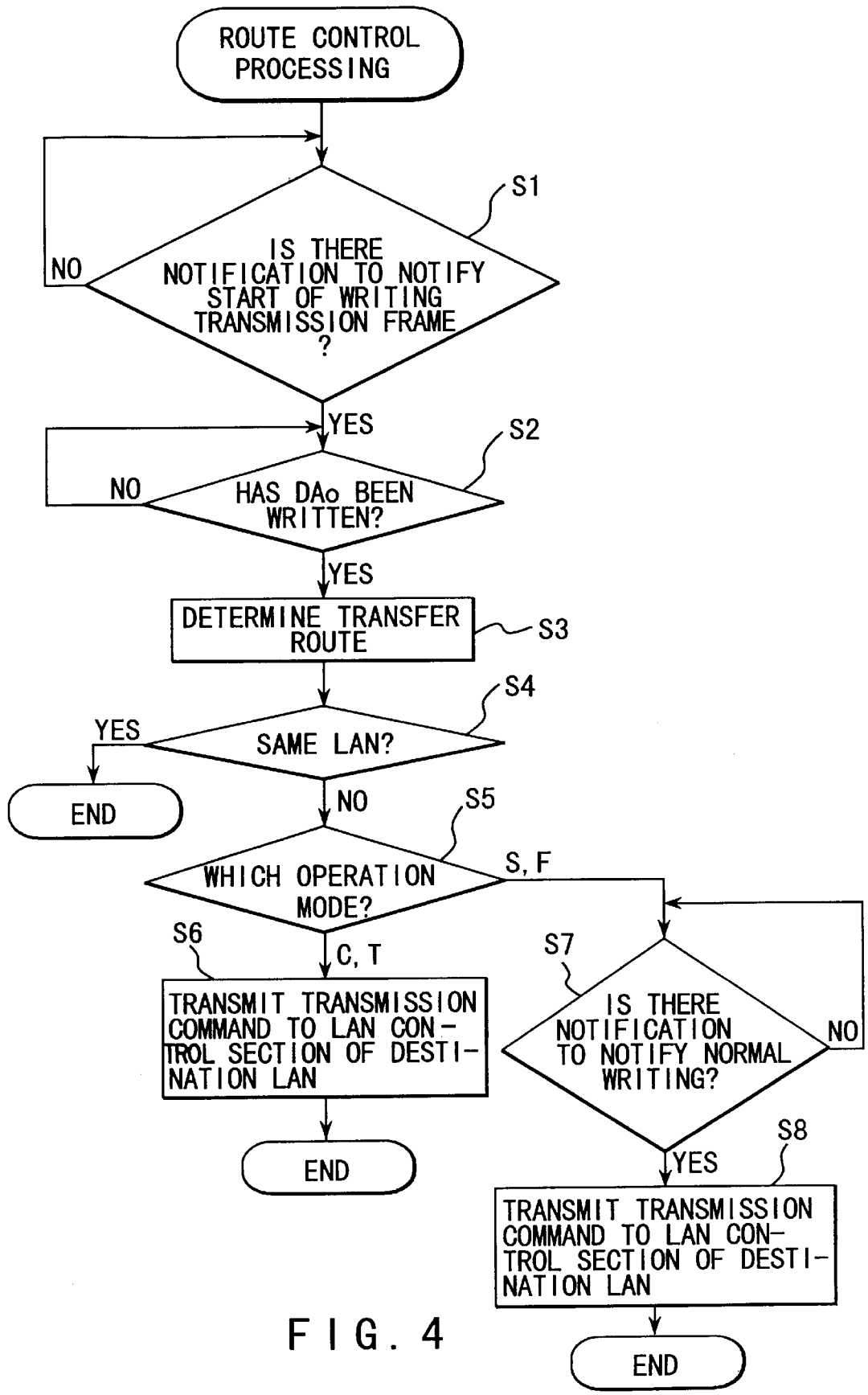
FIG. 4 is a flowchart, useful in explaining a transfer route determining operation performed in the network connection apparatus of the first embodiment.

The route control section 10 is constituted by a kind of a microcomputer, and adapted to execute transfer processing of the received transmission frame 6 in accordance with the flowchart of FIG. 4.

When the route control section 10 is informed from any one of the LAN control sections 8a–8n that a transmission frame 6 has been written into the common memory 9 (step S1), it confirms whether the destination address DA0 set in the front end portion of the frame is written in that area of the common memory 9 which corresponds to the LAN control section 8a–8n (step S2), thereby reading the destination address DA0 and determining from the read address DA0 the transfer route of the transmission frame 6, i.e. the destination LAN 1a–1n (step S3).

If the determined destination LAN 1a–1n is identical to a sender LAN 1a–1n, the route control section 10 does not transmit a transmission command (to transmit the transmission frame 6) and terminates the processing, since it is not necessary to transfer the frame 6 to another LAN 1a–1n (step S4).

If it is determined in the step S4 that the destination LAN is not identical to the sender LAN, the route control section 10 detects the operation mode set by the operation mode setting section 12 (step S5). If the operation mode is the C.T mode, the section 10 transmits a transmission command (to transmit the transmission frame 6) to that one of the LAN control sections 8a–8n which corresponds to the destination LAN 1a–1n (step S6). Thus, the data items of the frame 6 sequentially written into the common memory 9 are sequentially read therefrom and transmitted to the destination LAN 1a–1n.

If, on the other hand, the operation mode set in the step S5 is the S.F mode, the program proceeds to a step S7, where the route control section waits input of a notification to notify that the transmission frame 6 has normally been written, from the same LAN control section 8a–8n. Upon receiving the notification, a transmission command to transmit the transmission frame 6 is output to that one of the LAN control sections 8a–8n which corresponds to the previously determined destination LAN 8a–8n (step S8). As a result, the data items of the transmission frame 6 which are already written in the common memory 9 are sequentially read therefrom and transmitted to the destination LAN 1a–1n.

The transfer timing of the transmission frame 6 in the above-described network connection apparatus will now be described with reference to the timing chart of FIG. 5.

When one of the LAN control sections 8a–8n starts to receive a transmission frame 6 from that one of the LANs 1a–1n which is connected thereto, and starts to write the frame into the common memory 9, a notification to notify the start of writing is transmitted to the route control section 10 at a time point t1. Then, the route control section 10 starts route control for determining a destination LAN 1a–1n. Specifically, a destination address DA0 is written into the common memory 9 at a time point t2 to determine the destination LAN.

Where the operation mode is the C.T mode, the route control section 10 outputs a transmission command to transmit the transmission frame 6, to a corresponding LAN control section 8a–8n at once (i.e. at the time point t2). Thus, the transmission of the frame 6 to the determined destination LAN 1a–1n is started at a time point t3.

On the other hand, where the operation mode is the S.F mode, the route control section 10 outputs the transmission command to the corresponding LAN control section 8a–8n at a time point t4, at which it receives a notification to notify that writing of all data items of the transmission frame 6 into the common memory 9 has been finished (in other words, the data item of the frame 6 set in the rear end portion of the frame 6 has been written into the memory 9). Thus, the transmission of the frame 6 to the destination LAN 1a–1n is started at the time point t4.

In summary, in the C.T mode, the transmission of the transmission frame 6 to the destination LAN 1a–1n is started after only a short time Δt1 (=t2–t1) passes since the start of receiving the same. On the other hand, in the S.F mode, the transmission of the frame 6 to the destination LAN 1a–1n is started after a relatively long time Δt2 (=t4–t1) passes since the start of receiving the same.

Where the network connection apparatus 2 is incorporated in a network system which mainly requires high speed transmission of data, the operator of the network system selects the C.T mode in order to shorten the time required for data transmission between the nodes 4a–4n.

On the other hand, where the network connection apparatus 2 is incorporated in a network system which mainly requires transmission of highly reliable data, the operator of the network system selects the S.F mode in order to reduce the probability of transmission, to destination nodes 4a–4n, of a transmission frame 6 with an error or which has collided with another transmission frame, thereby to enhance reliability of data transmission.

(Second Embodiment)

FIG. 6 is a schematic block diagram, showing the structure of a network connection apparatus according to a second embodiment of the invention. The elements of FIG. 6 which are similar to those of FIG. 3 are designated by corresponding reference numerals, and are not described in detail.

In a network connection apparatus 2a according to the second embodiment, a LAN switch circuit 13 as a network switch circuit is interposed between each LAN 1a–1n and a corresponding LAN control section 8a–8n. More specifically, terminals 14a–14n provided on one side of the LAN switch circuit 13 are connected to the LANs 1a–1n, respectively, and terminals 15a–15n provided on the other side of the LAN switch circuit 13 are connected to the LAN control sections 8a–8n, respectively.

Further, the LAN switch circuit 13 contains data receiving buffers 17a–17n dedicated to the LANs 1a–1n, respectively, and each having a minimum memory capacity necessary for temporarily storing a transmission frame 6 output from a corresponding LAN.

In a normal state in which no control signal is input from the outside, the terminals 14a–14n of the LAN switch circuit 13 are connected to the terminals 15a–15n, respectively. Each of the LANs 1a–1n is connected to the corresponding one of the LAN control sections 8a–8n which is dedicated thereto.

Accordingly, transmission frames 6 input to the circuit 13 from the LANs 1a–1n are directly transmitted to the LAN control sections 8a–8n and also stored in the data receiving buffers 17a–17n, respectively.

Moreover, when the LAN switch circuit 13 receives from a route control section 10a a bypass command 18 which designates a destination LAN and a sender LAN, it connects that one of the terminals 14a–14n which corresponds to the sender LAN designated by the bypass command 18, to that one of the terminals 14a–14n which corresponds to the destination LAN designated by the bypass command 18 (i.e. the circuit 13 performs bypassing).

In the bypassed state, the transmission frame 6 input from the sender LAN 1a–1n is directly output to the nodes 4a–4n of the destination LAN 1a–1n via a corresponding buffer 17a–17n. Thus, the frame 6 does not pass the LAN control section 8a–8n.

When the bypass command 18 is released, the LAN switch circuit 13 is restored to the original state in which the terminals 14a–14n are connected to the terminals 15a–15n.

Each LAN control section 8a–8n operates in the same manner as each LAN control section 8a–8n employed in the apparatus of the first embodiment shown in FIG. 3.

The route control section 10a executes route control processing of the received frame 6 in accordance with the flowchart of FIG. 7.

The operations executed in steps S1–S5 of FIG. 7 are identical to those executed in the steps S1–S5 of FIG. 4, and hence will not be described.

If it is determined in the step S5 that the operation mode is the C.T mode, the program proceeds to a step S6A, where the route control section 10a supplies the LAN switch circuit 13 with a bypass command 18 which designates a destination LAN and a sender LAN determined in the step S3.

As a result, the LAN switch circuit 13 causes the transmission frame 6 input to the network connection apparatus 2a, to bypass the LAN control section 8a–8n and directly reach the destination LAN 1a–1n. Thus, the transmission processing efficiency is enhanced.

Further, since in this case, the transfer of the frame 6 is started when the destination address DA0 has been written into the common memory 9 and the destination LAN 1a–1n has been determined, the time required to transmit the transmission frame 6 is rather shortened as in the case of the first embodiment. In addition, the processing load applied on each LAN control section 8a–8n is reduced.

(Third Embodiment)

Figure 8:
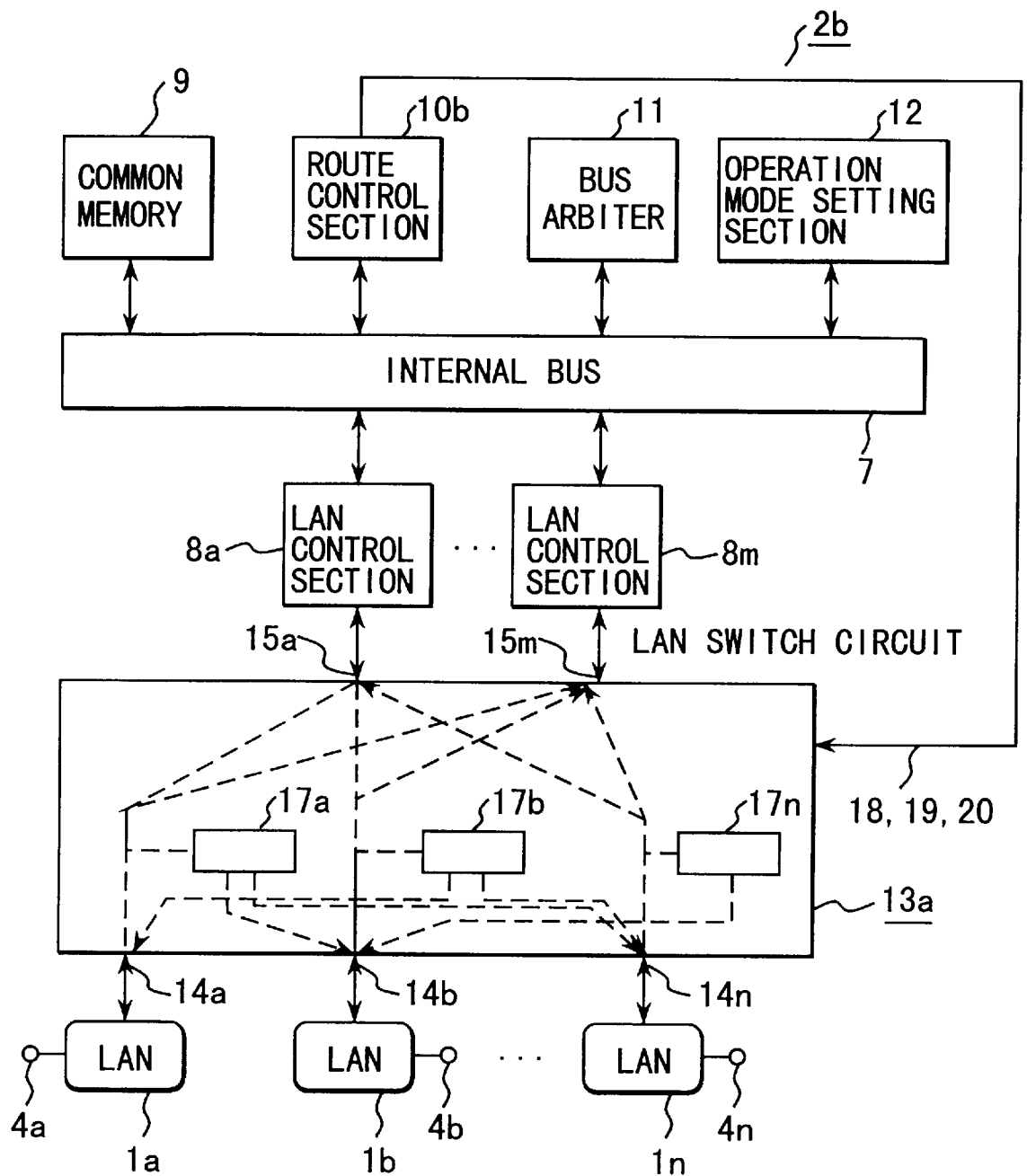
FIG. 8 is a schematic block diagram, showing the structure of a network connection apparatus according to a third embodiment of the invention.

FIG. 8 is a schematic block diagram, showing the structure of a network connection apparatus according to a third embodiment of the invention. The elements of FIG. 8 which are similar to those of FIG. 6 are designated by corresponding reference numerals, and are not described in detail.

In a network connection apparatus 2b according to the third embodiment, the number of LAN control sections 8a–8m incorporated in the apparatus 2b is smaller than that of LANs 1a–1n connected thereto.

Terminals 14a–14n provided on one side of a LAN switch circuit 13a are connected to the LANs 1a–1n, respectively, and terminals 15a–15m provided on the other side of the LAN switch circuit 13a are connected to the LAN control sections 8a–8m, respectively. It is not predetermined which one of the terminals 14a–14n on the one side is connected to each of the terminals 15a–15m on the other side.

Further, the LAN switch circuit 13a contains data receiving buffers 17a–17n dedicated to the LANs 1a–1n, respectively, and each having a minimum memory capacity necessary for temporarily storing the transmission frame 6 output from a corresponding LAN.

The LAN switch circuit 13a is supplied from the route control section 10b with a state signal 19 to indicate whether each LAN control section 8a–8m is in an operative state or in an inoperative state. Thus, the LAN switch circuit 13a grasps which one(s) of the LAN control sections 8a–8m is (are) in the inoperative state.

Figure 9:
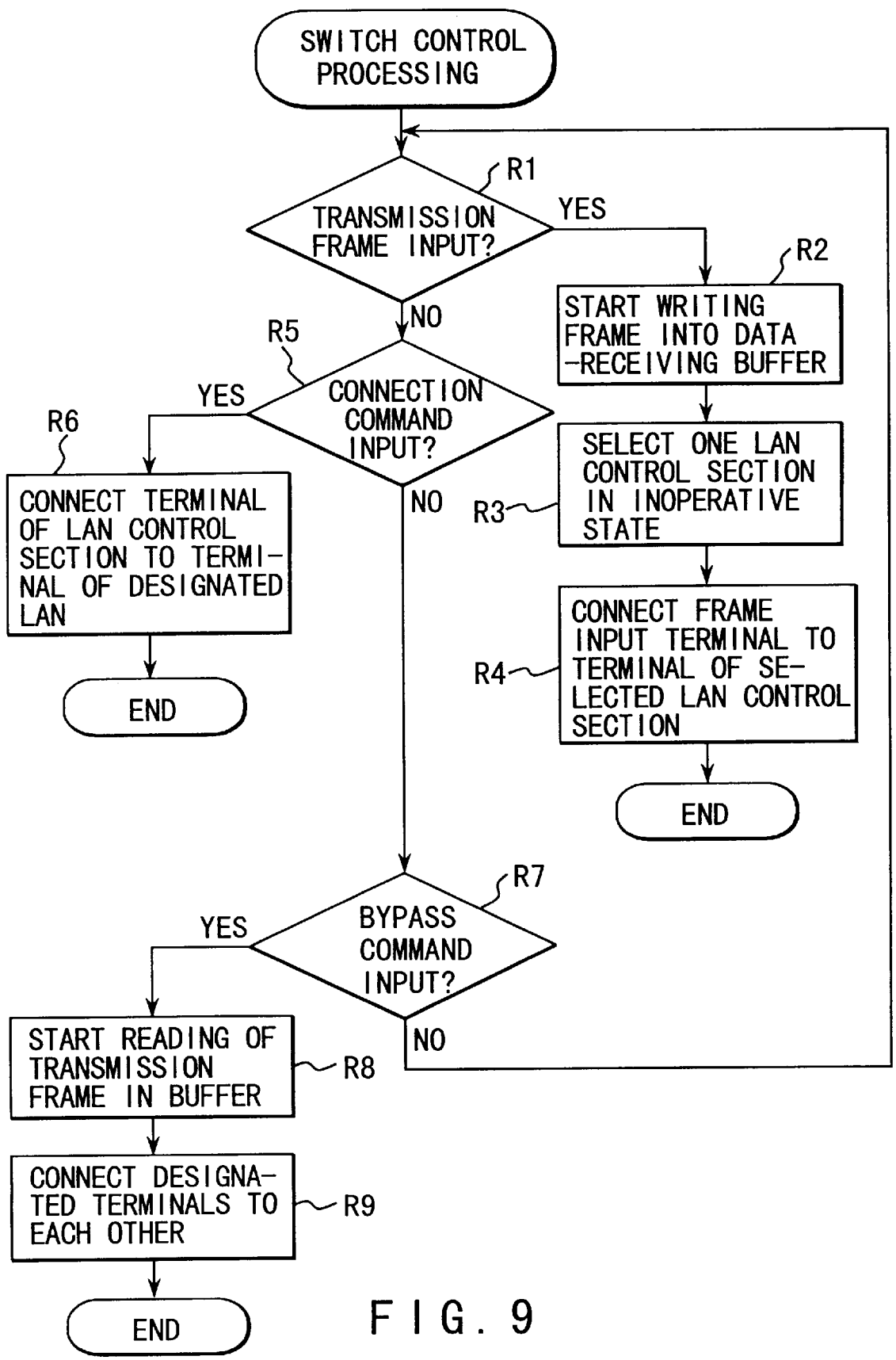
FIG. 9 is a flowchart, illustrating the operation of a LAN switch circuit incorporated in the network connection apparatus of the third embodiment.

The LAN switch circuit 13a executes switch control processing in accordance with the flowchart of FIG. 9.

When the LAN switch circuit 13a receives a transmission frame 6 from one of the LANs 1a–1n through a corresponding one of the terminals 14a–14n (step R1), the input transmission frame 6 starts to be written into that one of the data receiving buffers 17a–17n which is connected to the corresponding terminal 14a–14n (step R2). One of the LAN control sections in the inoperative state at present is selected (step R3). That one of the terminals 14a–14n which is supplied with the transmission frame 6 is connected to the node 15a–15m of the selected inoperative LAN control section 8a–8m (step R4). As a result, the transmission frame 6 is input to the selected inoperative LAN control section.

When the LAN switch circuit 13a receives, from the route control section 10b, a connection command 20 which designates one of the LAN control sections 8a–8m and a destination LAN 1a–1n (step R5), it connects the terminal 15a–15m of the one LAN control section 8a–8m to the terminal 14a–14n of the destination LAN 1a–1n (step R6). As a result, the transmission frame 6 input through the LAN control section 8a–8m is transmitted to the destination LAN 1a–1n.

When the LAN switch circuit 13a receives, from the route control section 10b, a bypass command 18 which designates a destination LAN and a sender LAN (step R7), it connects that one of the nodes 14a–14n which corresponds to the sender LAN, to that one of the terminals 14a–14n which corresponds to the destination LAN (step R8), thereby starting reading of the transmission frame 6 stored in that one of the data receiving buffers 17a–17n which is connected to the terminal connected to the sender LAN (step R9).

In this state, the transmission frame 6 output from the sender LAN is directly transmitted to the terminal 14a–14n connected to the destination LAN via the corresponding buffer 17a–17n. Thus, the transmission frame 6 does not pass the LAN control sections 8a–8m.

The route control section 10b monitors the operation state of each LAN control section 8a–8m in accordance with the flowchart of FIG. 10.

When the route control section 10b receives, from one of the LAN control sections 8a–8m, a notification to notify start of writing or to notify completion of normal writing (step Q1), it determines the state of the one LAN control section 8a–8m (step Q2). In other words, the route control section 10b determines that the LAN control section is in an operative state, when it receives the notification to notify the start of writing the transmission frame 6 into the common memory 9 by mean of the LAN control section.

Further, the route control section 10b determines that the LAN control section is in an inoperative state, when it receives the notification to notify the completion of normal writing, which is output after the LAN control section 8a–8m reads the transmission frame 6 and then a predetermined period of time elapses. A state signal 19 indicative of the determination result, i.e. indicative of the state of the LAN control section 8a–8m, is supplied to the LAN switch circuit 13a (step Q3). Thus, the LAN switch circuit 13a grasps the state of each LAN control section 8a–8m.

Upon receiving the transmission frame 6, the LAN control section 8a–8m starts writing of the same into the common memory 9, and simultaneously supplies the route control section 10b with a notification to notify the start of writing. Further, when the frame 6 has been normally written into the common memory 9, the route control section 10b supplies the route control section 10b with a notification to notify completion of normal writing.

Figure 11:
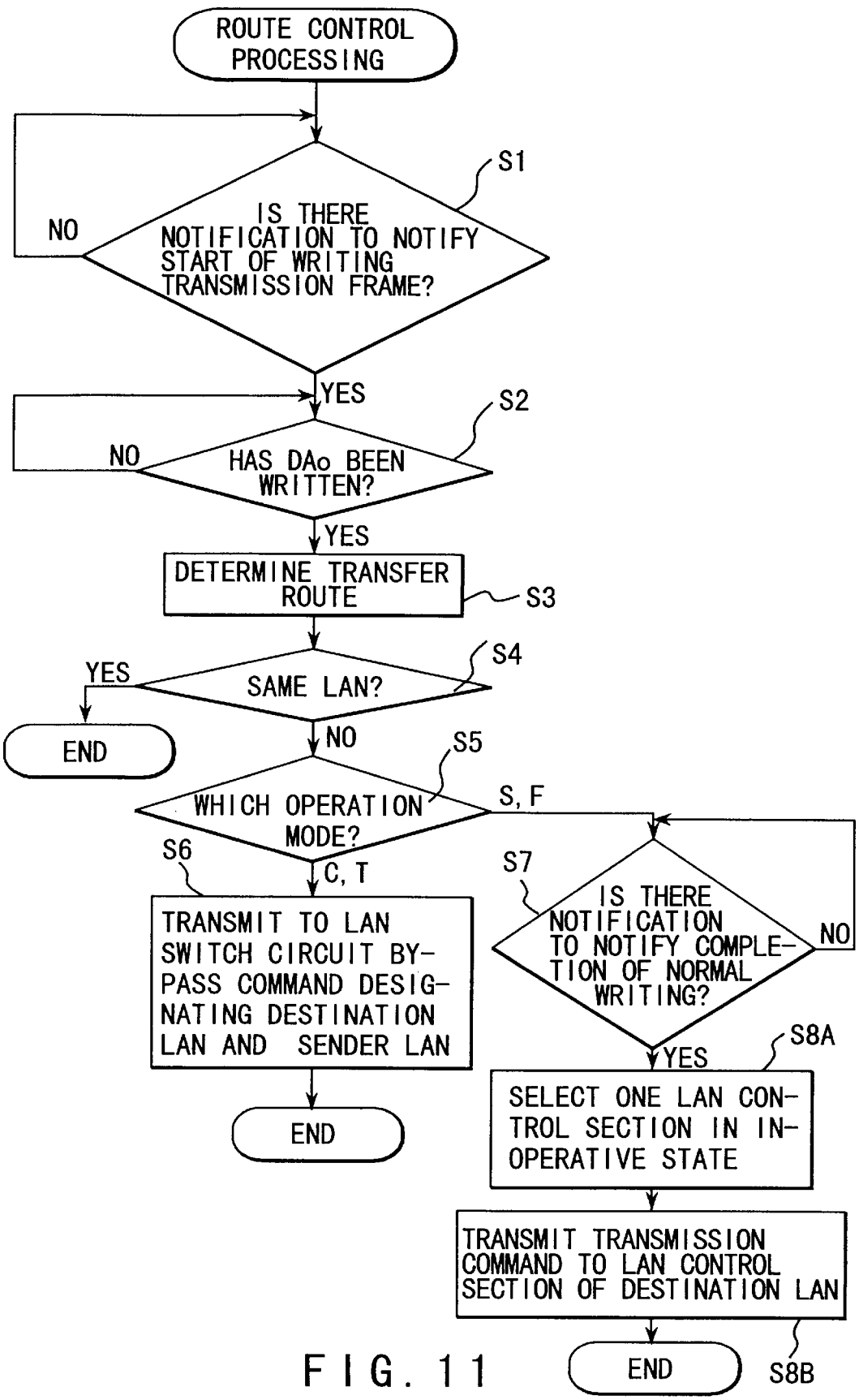
FIG. 11 is a flowchart, useful in explaining a transfer route determining operation performed in the network connection apparatus of the third embodiment.

Furthermore, upon receiving the notification to notify the start of writing from the LAN control section 8a–8m, the route control section 10b executes route control processing in accordance with the flowchart of FIG. 11.

The operations executed in steps S1–S6A of FIG. 11 are identical to those executed in the steps S1–S6A of FIG. 7, and hence will not be described.

In the step S6A of FIG. 11, the route control section 10b supplies the LAN switch circuit 13a with a bypass command 18 which designates the destination LAN and the sender LAN of the transmission frame 6. As described above, the LAN switch circuit 13a connects that one of the terminals 14a–14n which corresponds to the sender LAN, to that one of the terminals 14a–14n which corresponds to the destination LAN.

As result, the LAN switch circuit 13a causes the transmission frame 6 input to the network connection apparatus 2b to bypass the LAN control sections 8a–8m and directly reach the destination LAN 1a–1n, thereby enhancing the transmission efficiency.

Upon receiving a notification to notify completion of normal writing in a step S7 of FIG. 11, the route control section 10b selects one of the LAN control sections 8a–8m in an inoperative state at present (step S8A). Subsequently, the route control section 10b supplies the selected LAN control section 8a–8m with a transmission command which designates the destination LAN 1a–1n, and simultaneously supplies the LAN switch circuit 13a with a connection command 20 to connect the selected LAN control section 8a–8m to the destination LAN 1a–1n.

As described above, upon receiving the connection command 20, the LAN switch circuit 13a connects the selected LAN control section 8a–8m to the destination LAN 1a–1n. Thus, when the operation mode is the S.F mode, the transmission frame 6 read from the common memory 9 is correctly transferred to the destination LAN 1a–1n.

In the above-described apparatus of the third embodiment, the number of the LAN control sections 8a–8m is made smaller than that of the LANs 1a–1n, thereby making the overall apparatus simple in structure and reducing its manufacturing cost. Further, selection of the operation mode enables a high data transmission efficiency or high data transmission reliability to be secured.

In addition, since the connection relationship between the LANs 1a–1n and the LAN control sections 8a–8m can be varied in the LAN switch circuit 13a, concentration of load on a particular one of the LAN control sections 8a–8m can be avoided.

(Fourth Embodiment)

FIG. 12 is a schematic block diagram, showing the structure of a network connection apparatus according to a fourth embodiment of the invention. The elements of FIG. 8 which are similar to those of FIG. 6 are designated by corresponding reference numerals, and are not described in detail.

In a network connection apparatus 2c according to the fourth embodiment, the operation mode setting section 12 is not employed, and the operation mode is fixed at the S.F mode. A route control section 10c does not output the bypass command 18, and a LAN switch circuit 13b does not employ the buffers 17a–17n.

Even in the thus-constructed network connection apparatus 2c, the route control section 10c monitors the operation state of each LAN control section 8a–8m, and outputs the state signal 19 to the LAN switch circuit 13b. Accordingly, each transmission frame 6 input from each LAN 1a–1n to the LAN switch circuit 13b is transferred to a corresponding LAN control section 8a–8m which is in the inoperative state.

As a result, a uniform load can be applied to each LAN control section 8a–8m, and the number of required LAN control sections can be reduced.

The invention is not limited to the above-described embodiments.

In the third and fourth embodiments shown in FIGS. 8 and 12, the route control sections 10b and 10c determine that each LAN control section 8a–8m is in the operative state or in the inoperative state, on the basis of a notification to notify the start of writing and a notification to notify the completion of writing output from the LAN control section 8a–8m.

However, when a great number of transmission frames 6 are respectively input to the LAN control sections 8a–8m from the nodes 4a–4e in a short time, all the LAN control sections 8a–8m become operative. In this case, each LAN control section 8a–8m temporarily stores the input transmission frame 6 into its internal memory and then into the common memory 9.

Each LAN control section 8a–8m informs the route control section 10b, 10c of the number of transmission frames stored in its internal memory. The route control section 10b, 10c, in turn, detects the loaded condition of the LAN control section on the basis of the informed number of transmission frames, and informs the loaded condition to the LAN switch circuit 13a, 13b.

Upon receiving a new transmission frame 6 from one of the terminals 14a–14n, the LAN switch circuit 13a, 13b connects the one of the terminals 14a–14n to the terminal 15a–15m of that one of the LAN control sections 8a–8m, the load on which is relatively light.

In the third and fourth embodiments shown in FIGS. 8 and 12, the route control section 10b, 10c monitors whether or not each LAN control section 8a–8m is in the operative state, and supplies the LAN switch circuit 13a, 13b with a state signal 19 indicative of the state of the LAN control section. However, the function for monitoring each LAN control section 8a–8m may be imparted to the LAN switch circuit 13a itself. In this case, the route control section 10b, 10c need not monitor the state of each LAN control section 8a–8m.

What is claimed is:

1. A network connection apparatus connected between a plurality of networks for transferring, to a destination node belonging to one of the networks, a transmission frame output from a sender node belonging to another network, the transmission frame including a destination address, a sender address and transmission data, comprising:

a common memory for temporarily storing transmission frames;

a plurality of network control sections each for writing into the common memory a transmission frame output from that one of the networks which is connected thereto, outputting a notification to notify start of writing and a notification to notify completion of normal writing, and reading the transmission frame written in the common memory in response to a transmission command, so as to transmit the transmission frame to the network connected thereto;

means for setting the operation mode of the network connection apparatus to a Cut Through Mode or a Store & Forward Mode;

means operative in the Cut Through Mode for receiving from each network control section the notification to notify start of writing, and transmitting the transmission command to that one of the network control sections which is connected to a destination network determined by the destination address included in a transmission frame; and means operative in the Store & Forward Mode for receiving from each network control section the notification to notify completion of normal writing, and transmitting the transmission command to that one of the network control sections which is connected to the destination network determined by the destination address included in a transmission frame.

2. A network connection apparatus connected between a plurality of networks for transferring, to a destination node belonging to one of the networks, a transmission frame output from a sender node belonging to another network, the transmission frame including a destination address, a sender address and transmission data, comprising:

a common memory for temporarily storing transmission frames;

a plurality of network control sections each for writing into the common memory a transmission frame output from that one of the networks which is connected thereto, outputting a notification to notify start of writing and a notification to notify completion of normal writing, and reading the transmission frame written in the common memory in response to a transmission command, so as to transmit the transmission frame to the network connected thereto;

a network switch circuit interposed between each network and a corresponding network control section for connecting the each network and the corresponding network control section in a normal state, and directly transmitting a transmission frame output from a sender network, to a destination network when receiving a bypass command which designates the destination network and the sender network;

means for setting the operation mode of the network connection apparatus to a Cut Through Mode or a Store & Forward Mode;

means operative in the Cut Through Mode for receiving from each network control section the notification to notify start of writing, and transmitting to the network switch circuit the bypass command which designates the destination network and the sender network determined by the destination address and the sender address included in the transmission frame, respectively; and means operative in the Store & Forward Mode for receiving from each network control section the notification to notify completion of normal writing, and transmitting the transmission command to that one of the network control sections which is connected to the destination network determined by the destination address included in the transmission frame.

3. A network connection apparatus connected between a plurality of networks for transferring, to a destination node belonging to one of the networks, a transmission frame output from a sender node belonging to another network, the transmission frame including a destination address, a sender address and transmission data, comprising:

a common memory for temporarily storing transmission frames;

a plurality of network control sections each for writing into the common memory a transmission frame output from each network, outputting a notification to notify start of writing and a notification to notify completion of normal writing, and reading the transmission frame written in the common memory in response to a transmission command, so as to transmit the transmission frame to a designated destination network;

monitor means for monitoring the operation state of each network control section;

a network switch circuit interposed between each network and each network control section for connecting, when receiving a transmission frame from one of the networks, the one network to that one of the network control sections which is determined by the monitor means to be in a lightly loaded state, and directly transmitting, when receiving a bypass command which designates a destination network and a sender network, a transmission frame output from the sender network, to the destination network;

means for setting the operation mode of the network connection apparatus to a Cut Through Mode or a Store & Forward Mode;

means operative in the Cut Through Mode for receiving from each network control section the notification to notify start of writing, and transmitting to the network switch circuit the bypass command which designates the destination network and the sender network determined by the destination address and the sender address included in the transmission frame, respectively; and means operative in the Store & Forward Mode for receiving from each network control section the notification to notify completion of normal writing, and transmitting a transmission command to another each network control section.

4. A network connection apparatus connected between a plurality of networks for transferring, to a destination node belonging to one of the networks, a transmission frame output from a sender node belonging to another network, the transmission frame including a destination address, a sender address and transmission data, comprising:

a common memory for temporarily storing transmission frames;

a plurality of network control sections each for writing into the common memory a transmission frame output from each network, and reading the transmission frame written in the common memory, and outputting the read transmission frame to a designated destination network;

monitor means for monitoring the operation state of each network control section; and a network switch circuit interposed between each network and each network control section for connecting, when receiving a transmission frame from one of the networks, the one network to that one of the network control sections which is determined by the monitor means to be in a lightly loaded state.

5. The network connection apparatus according to any one of claims 1–3, wherein the operation mode is set by switching a dual in-line package switch or operating a key on a keyboard.

6. The network connection apparatus according to any one of claims 2–3, wherein the transmission of the transmission command or the bypass command is stopped, if the destination address included in the transmission frame stored in the common memory addresses a destination node belonging to the sender network, when the notification to notify start of writing or to notify completion of normal writing is output from the network control section.

7. The network connection apparatus according to any one of claims 1–3, wherein when each of the network control sections detects an error in a transmission frame or collision of the transmission frame with another frame while the transmission frame is transmitted to a network connected to the network control section, the network control section again transmits the same transmission frame.

8. The network connection apparatus according to claim 1, wherein:

when the operation mode is the Cut Through Mode, the transmission command is transmitted in synchronism with writing, into the common memory, of the destination address set in a front end portion of the received transmission frame; and when the operation mode is the Store & Forward Mode, the transmission command is transmitted in synchronism with writing, into the common memory, of a rear end portion of the received transmission frame.

9. The network connection apparatus according to claim 2 or 3, wherein:

when the operation mode is the Cut Through Mode, the bypass command is transmitted in synchronism with writing, into the common memory, of the destination address set in a front end portion of the received transmission frame; and when the operation mode is the Store & Forward Mode, the transmission command is transmitted in synchronism with writing, into the common memory, of a rear end portion of the received transmission frame.

10. The network connection apparatus according to claim 2 or 3, wherein the network switch circuit includes a plurality of data-receiving buffers each for temporarily storing a transmission frame output from a corresponding one of the networks, and transmitting the temporarily stored transmission frame to the destination network designated by the bypass command.

11. The network connection apparatus according to claim 3 or 4, wherein the number of the network control sections connected to the network switch circuit is less than that of the networks connected to the network switch circuit.

12. The network connection apparatus according to claim 3, wherein the lightly loaded state determined by the monitor means indicates an inoperative state.

13. The network connection apparatus according to claim 4, wherein the lightly loaded state determined by the monitor means indicates an inoperative state.

14. The network connection apparatus according to claim 12 or 13, wherein the monitor means determines that each network control section is in the inoperative state, before the network control section outputs the notification to notify start of writing and after the network control section outputs the notification to notify completion of normal writing.

15. The network connection apparatus according to claim 12, wherein said another each network control section which receives the notification to notify completion of normal writing and then transmits the transmission command corresponds to the network control section determined to be in the inoperative state.

16. The network connection apparatus according to claim 3 or 4, wherein the monitor means is incorporated in the network switch circuit.

* * * * *